(12) United States Patent
Zhevelev et al.

(10) Patent No.: US 11,680,960 B2
(45) Date of Patent: Jun. 20, 2023

(54) MOTION DETECTOR WITH ADJUSTABLE PATTERN DIRECTION

(71) Applicant: Johnson Controls Tyco IP Holdings LLP, Milwaukee, WI (US)

(72) Inventors: Boris Zhevelev, Rishon-Le-Zion (IL); Michael Hahamov, Kiryat Gat (IL)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 17/008,900

(22) Filed: Sep. 1, 2020

(65) Prior Publication Data

US 2021/0072277 A1    Mar. 11, 2021

Related U.S. Application Data

(60) Provisional application No. 62/896,389, filed on Sep. 5, 2019.

(51) Int. Cl.
*G01P 13/00* (2006.01)
*G08B 7/06* (2006.01)

(52) U.S. Cl.
CPC ............... *G01P 13/00* (2013.01); *G08B 7/06* (2013.01)

(58) Field of Classification Search
CPC .................................. G01P 13/00; G08B 7/06
See application file for complete search history.

(56) References Cited

U.S. PATENT DOCUMENTS

| | | | | |
|---|---|---|---|---|
| 3,864,567 A * | 2/1975 | Bez | ......................... | G01S 3/786 250/232 |
| 4,757,204 A * | 7/1988 | Baldwin | ............... | G08B 13/193 250/353 |
| 4,896,039 A * | 1/1990 | Fraden | ................. | G08B 13/193 340/567 |
| 5,221,919 A * | 6/1993 | Hermans | .............. | G08B 13/193 340/693.11 |
| 5,299,971 A * | 4/1994 | Hart | ........................ | G09F 27/00 340/567 |
| 5,463,595 A * | 10/1995 | Rodhall | ................. | G08B 13/00 340/426.25 |
| 5,511,832 A * | 4/1996 | Kunzel | ............... | E05B 63/0017 292/144 |
| 6,097,029 A * | 8/2000 | Downie | ............... | G06V 10/147 250/332 |
| 6,100,528 A * | 8/2000 | Wilt | .......................... | G01J 3/02 250/341.8 |
| 6,100,803 A * | 8/2000 | Chang | .................... | G08B 13/19 250/221 |
| 6,222,191 B1 * | 4/2001 | Myron | ................. | G08B 13/193 250/353 |

(Continued)

*Primary Examiner* — Joseph H Feild
*Assistant Examiner* — Rufus C Point
(74) *Attorney, Agent, or Firm* — ArentFox Schiff LLP

(57) ABSTRACT

Aspects of the present disclosure include a PIR assembly including a dome comprising a plurality of optical components, a stationary circuit board, and a moveable PIR sensor moveably coupled to the stationary circuit board via a flexible cable, wherein the moveable PIR sensor is configured to move to a first position to monitor a first zone via a first optical component of the plurality of optical components and to a second position to monitor a second zone via a second optical component of the plurality of optical components.

13 Claims, 3 Drawing Sheets

(56) References Cited

U.S. PATENT DOCUMENTS

| | | | | |
|---|---|---|---|---|
| 6,317,040 B1* | 11/2001 | Ikeda | G08B 29/18 340/552 |
| 6,348,691 B1* | 2/2002 | Sandell | G08B 13/193 340/567 |
| 7,286,052 B2* | 10/2007 | DiPoala | G08B 29/18 340/540 |
| 7,456,737 B2* | 11/2008 | DiPoala | G08B 13/19 340/540 |
| 9,485,477 B2* | 11/2016 | DiPoala | G08B 17/00 |
| 9,578,291 B2* | 2/2017 | DiPoala | H04N 7/183 |
| 9,948,902 B1 | 4/2018 | Trundle | G06V 20/52 |
| 10,267,685 B1* | 4/2019 | Xu | G02B 5/09 |
| 10,375,361 B1 | 8/2019 | Trundle | H04N 7/183 |
| 2002/0054211 A1* | 5/2002 | Edelson | H04N 7/183 348/169 |
| 2002/0108230 A1* | 8/2002 | Soloway | G08B 13/19 29/432 |
| 2003/0065472 A1* | 4/2003 | Eckel | H05B 47/105 702/130 |
| 2003/0136200 A1* | 7/2003 | Cardelius | G01N 29/326 73/861.27 |
| 2004/0246723 A1* | 12/2004 | Graves | F21V 23/0442 362/276 |
| 2005/0231352 A1* | 10/2005 | DiPoala | G08B 29/18 340/541 |
| 2007/0106172 A1* | 5/2007 | Abreu | A61P 7/02 600/549 |
| 2008/0042832 A1* | 2/2008 | DiPoala | G08B 29/18 340/541 |
| 2011/0050405 A1* | 3/2011 | Hollis, Jr. | G06F 3/016 340/407.2 |
| 2011/0132086 A1* | 6/2011 | Wang | G01D 11/245 73/431 |
| 2012/0049067 A1* | 3/2012 | Takahashi | H01L 37/02 250/338.2 |
| 2012/0242635 A1* | 9/2012 | Erhart | G06F 1/1684 345/207 |
| 2013/0182115 A1* | 7/2013 | Willis | H04Q 9/00 348/155 |
| 2014/0002648 A1* | 1/2014 | DiPoala | G08B 13/19697 348/143 |
| 2016/0014313 A1* | 1/2016 | Müller | H04N 23/57 29/831 |
| 2017/0356225 A1* | 12/2017 | Maatta | H04M 1/022 |
| 2018/0024020 A1* | 1/2018 | Stefanescu | G01L 19/145 73/721 |
| 2018/0322751 A1* | 11/2018 | Sacre | G03B 15/03 |
| 2018/0332204 A1* | 11/2018 | Chien | F21V 33/0052 |
| 2018/0375514 A1* | 12/2018 | Liggenstorfer-Heimlicher | H03K 17/9505 |
| 2019/0056047 A1* | 2/2019 | Staton | B65D 63/10 |
| 2019/0253670 A1* | 8/2019 | Chien | F21L 4/005 |
| 2020/0080739 A1* | 3/2020 | Koss | F24F 11/62 |
| 2020/0340658 A1* | 10/2020 | Radermacher | H05B 47/115 |
| 2021/0132708 A1* | 5/2021 | Ayala Linares | H04L 67/141 |

* cited by examiner

MOTION DETECTOR WITH ADJUSTABLE PATTERN DIRECTION

CROSS REFERENCE TO RELATED APPLICATIONS

The current application claims priority to U.S. Provisional Application No. 62/896,389 filed on Sep. 5, 2019, entitled "Motion Detector with Adjustable Pattern Direction," the contents of which are incorporated by reference in their entireties.

BACKGROUND

A passive infrared (PIR) motion sensor may respond to changes of infrared (IR) radiation emitted by objects in the field of view of the detector. PIR sensors may be used in security systems to detect intrusions, and/or appliances for automated energy control applications. To improve the sensitivity of a PIR sensor, it may be important to point the detection optics toward the zone to be monitored. However, alignment of the detection optics of the PIR sensor may not always be trivial because as the height of the PIR sensor changes (e.g., placed on ceilings of different heights), the angle of the PIR sensor (e.g., relative to the ceiling) may not be optimal for the zone to be monitored. Therefore, it may be desirable to easily align the detection optics of the PIR sensor toward the zone to be monitored.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

An aspect of the present disclosure includes a PIR assembly including a dome comprising a plurality of optical components, a stationary circuit board, and a moveable PIR sensor moveably coupled to the stationary circuit board via a flexible cable, wherein the moveable PIR sensor is configured to move to a first position to monitor a first zone via a first optical component of the plurality of optical components and to a second position to monitor a second zone via a second optical component of the plurality of optical components.

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

The term "processor," as used herein, can refer to a device that processes signals and performs general computing and arithmetic functions. Signals processed by the processor can include digital information, data signals, computer instructions, processor instructions, control messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein.

The term "bus," as used herein, can refer to an interconnected architecture that is operably connected to transfer data between computer components within a singular or multiple systems. The bus can be a memory bus, a memory controller, a peripheral bus, an external bus, a crossbar switch, and/or a local bus, among others.

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

Certain aspects of the present disclosure may include a long-range (e.g., 5 meters (m), 10 m, 20 m, 30 m, etc.) ceiling detector with an adjustable optical pattern and its directivity for matching the installation height with the required detection distance. In some aspects, a 360° omnidirectional survey zone may be divided into four equal sectors. Each sector may be equipped with dedicated optics. Each sector may include optics that are matched with a dedicated PIR sensor. Each PIR sensor may be fixed on a dedicated spacer, with orientations that can be adjusted separately or simultaneously relatively to the sector optics to improve performance for specific installation height and detection distance. In one implementation, every PIR sensor may be placed on a movable printed board where the position and orientation can be changed relatively to corresponding optics. Each of the four movable printed boards are electrically coupled with a fixed printed board so, that corresponded electrical circuit is a common for all four PIR sensors.

Figure 1:
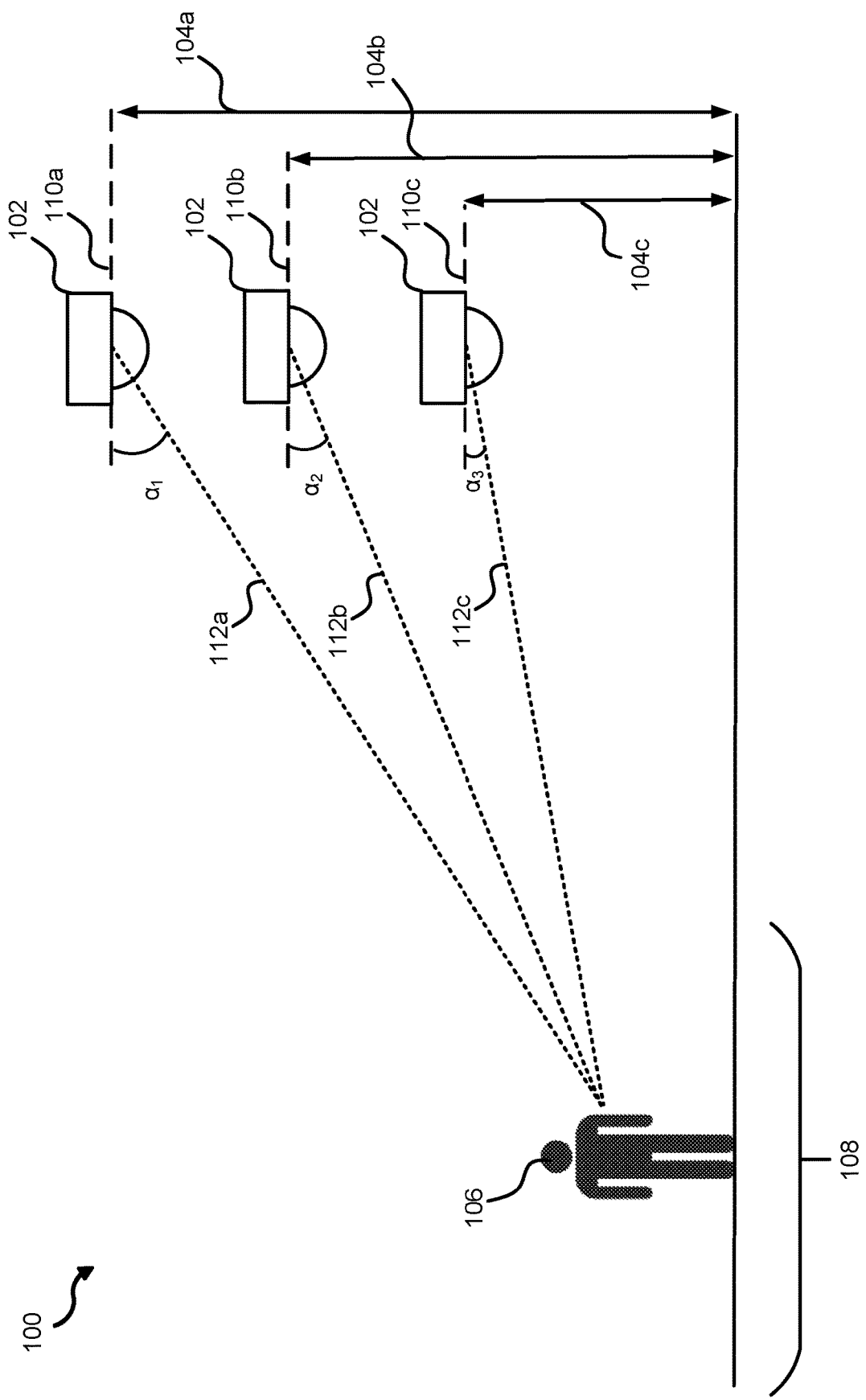
FIG. 1 illustrates an example of an environment for adjusting PIR sensors orientation in one or more PIR assemblies in accordance with aspects of the present disclosure.

In some aspects, a ceiling motion detector with 360° long range survey capability may include four mutually orthogonally oriented optics with 90° survey angle, which are aligned to four PIR sensors. The position of each PIR sensor can be adjusted and oriented separately or equally all together relative to the corresponding matrix of segmented optics, where each segment is directed to a specific direction. The adjustment criterion is the improved position and orientation of PIR sensors to increase signal-to-noise ratio to achieve reliable motion detection in all survey areas Referring to FIG. 1, in some aspects of the present disclosure, an example of an environment 100 for adjusting the PIR sensors. FIG. 1 shows a PIR assembly 102 placed at three different heights (e.g., an 8-foot ceiling, a 10-foot ceiling, and a 12-foot ceiling). In some examples, the environment 100 may include the PIR sensor assembly 102 placed at a first height 104a, the PIR sensor assembly 102 placed at a second height 104b, and the PIR sensor assembly 102 placed at a third height 104c. The environment 100 may include an intended detection target 106 in a detection zone 108. The PIR sensor assembly 102 may include one or more PIR sensors (not shown, described in more detail below).

In some implementations, the PIR sensors in the PIR assembly 102 may be placed such that the surfaces of the PIR sensors face the intended detection target 106 in the detection zone 108. Since the PIR assembly 102 are placed at different heights, the placement angles (individually defined as the vector normal to the surface of the PIR sensor and the horizontal surface) of the PIR sensors may be different. In order to maximize detection sensitivity, the vector normal to the surface of the PIR sensor should point toward the intended detection target 106. In some examples, the PIR sensor of the PIR assembly 102 placed at a first height 104a includes a first placement angle $\alpha_1$ between a first horizontal surface 110a and a first normal vector 112a. The PIR sensor of the PIR assembly 102 placed at a second height 104b includes a second placement angle $\alpha_2$ between a second horizontal surface 110b and a second normal vector 112b. The PIR sensor of the PIR assembly 102 placed at a third height 104c includes a third placement angle $\alpha_3$ between a third horizontal surface 110c and a third normal vector 112c.

Figure 2:
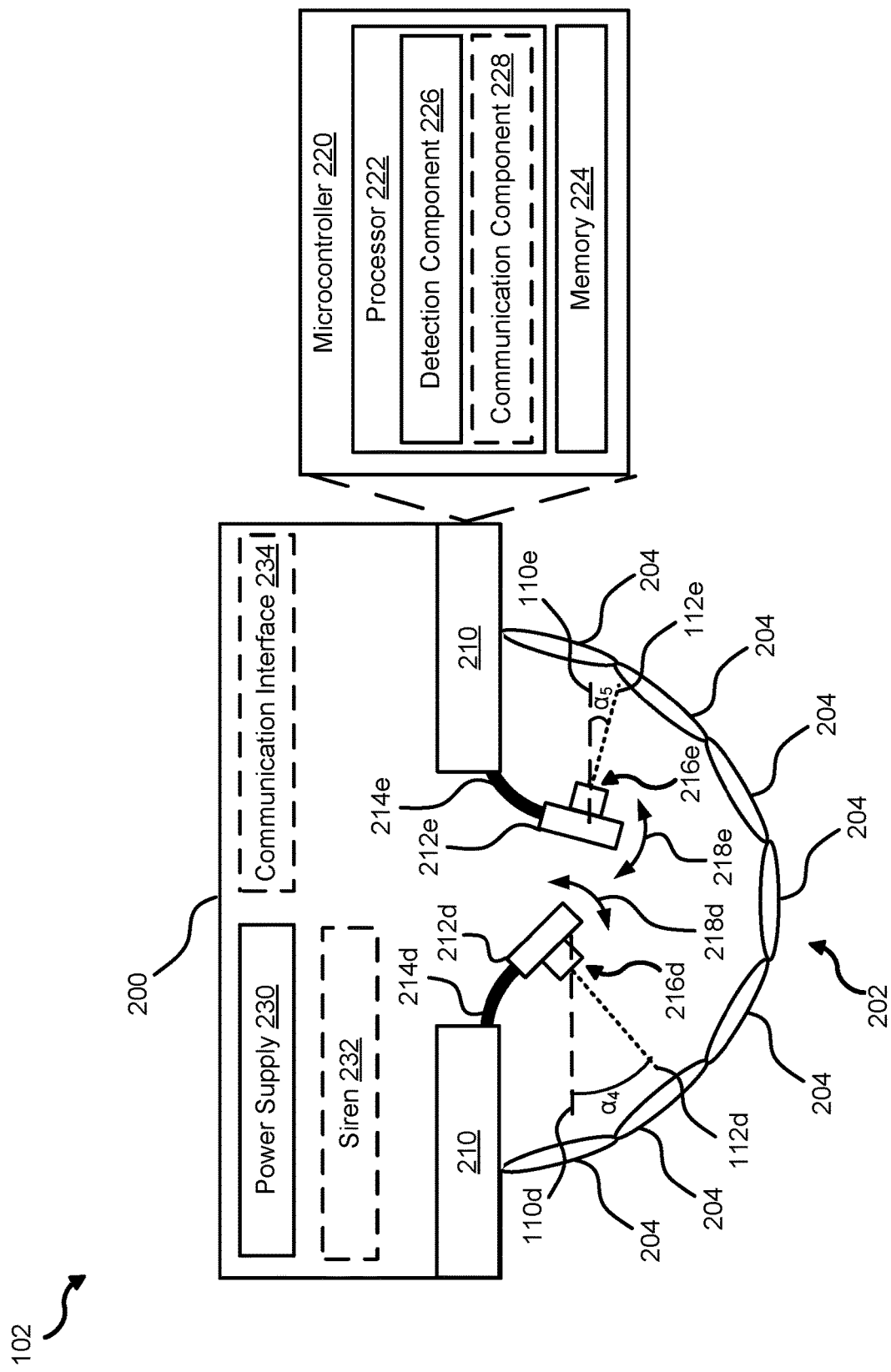
FIG. 2 illustrates an example of a PIR sensor in accordance with aspects of the present disclosure.

Turning to FIG. 2, an example of the PIR assembly 102 may include a casing 200 and a dome 202. The dome 202 may include a plurality of optical components 204, such as Fresnel lens segments, collimators, etc. In some examples, the casing 200 may include a stationary circuit board 210. The stationary circuit board 210 may be hollow in the middle (e.g., washer shape). In other implementations, the stationary circuit board 210 may include a plurality of circuit boards. The stationary circuit board 210 may be fixed relative to the casing 200 and/or the dome 202. The stationary circuit board 210 may include and be communicatively coupled with moveable PIR sensors 212d, 212e. The moveable PIR sensors 212d, 212e may be moveable, turnable, and/or rotatable. The stationary circuit board 210 may be communicatively coupled with first and second moveable PIR sensors 212d, 212e via first and second flexible cables 214d, 214e. The first flexible cable 214d may include one or more wires to connect it with the stationary circuit board 210 to the first moveable PIR sensor 212d. The first flexible cable 214d may include one or more wires that provide detection signals from the first moveable PIR sensor 212d to the stationary circuit board 210 and/or configuration signals from the stationary circuit board 210 to the first moveable PIR sensor 212d. The first flexible cable 214d may enable the first moveable PIR sensor 212d to move 218d to a fixed position and remain in the fixed position. The first flexible cable 214d may have a stiffness that enables the first moveable PIR sensor 212d to remain in the fixed position. The second flexible cable 214e may include one or more wires that supply electrical energy from the stationary circuit board 210 to the second moveable PIR sensor 212e. The second flexible cable 214e may include one or more wires that provide detection signals from the second moveable PIR sensor 212e to the stationary circuit board 210 and/or configuration signals from the stationary circuit board 210 to the second moveable PIR sensor 212e. The second flexible cable 214e may enable the second moveable PIR sensor 212e to move 218e to a fixed position and remain in the fixed position. The second flexible cable 214e may have a stiffness that enables the second moveable PIR sensor 212e to remain in the fixed position.

In some implementations, the first and second moveable PIR sensors 212d, 212e may be detachably coupled to a portion of the casing 200, the dome 202, and/or the stationary circuit board 210 using one or more fasteners (not shown). For example, the first moveable PIR sensor 212d may be moved 218d to a position such that a fourth normal vector 112d normal to a first surface 216d of the first moveable PIR sensor 212d and a fourth horizontal surface 110d form a fourth placement angle $\alpha_4$. The first moveable PIR sensor 212d may be placed as described above so the fourth normal vector 112d points or substantially points toward a first intended detection target (not shown). Such placement of the first moveable PIR sensor 212d may maximize or substantially maximize the detection sensitivity of the first moveable PIR sensor 212d.

In another non-limiting example, the second moveable PIR sensor 212e may be moved 218e to a position such that a fifth normal vector 112e normal to a second surface 216e of the second moveable PIR sensor 212e and a fifth horizontal surface 110e form a fifth placement angle $\alpha_5$. The second moveable PIR sensor 212e may be placed as described above so the fifth normal vector 112e points or substantially points toward a second intended detection target (not shown). Such placement of the second moveable PIR sensor 212e may maximize or substantially maximize the detection sensitivity of the second moveable PIR sensor 212e.

In some instances, the stationary circuit board 210 of the PIR assembly 102 may include a microcontroller 220. The microcontroller 220 may include a processor 222 configured to execute instructions stored in a memory 224. In some examples, the processor 222 may include a detection component 226 that receives the detection signals from the first and/or second moveable PIR sensors 212d, 212e. The processor 222 may include an optional communication component 228 that communicates with one or more external devices (not shown), such as alarm panels, mobile devices, etc.

In some examples, the PIR assembly 102 may include a power supply 230. The power supply 230 may include one or more batteries and/or one or more power adaptors that receive power from an alternating current source. The PIR assembly 102 may include an optional siren 232 that emits warning sounds when the PIR assembly 102 detects a potential target. The optional siren 232 may optionally also include a light, such as a strobe light. The PIR assembly 102 may include an optional communication interface 234, such as a modem, to communicate with the one or more external devices.

While the PIR assembly 102 shown in FIG. 2 includes two moveable PIR sensors (i.e., the first and second moveable PIR sensors 212d, 212e), other aspects of the present disclosure may include more or less moveable PIR sensors, e.g., one or four. For example, the PIR assembly 102 may use two moveable PIR sensors, each monitoring 180° of view. In a non-limiting example, the PIR assembly 102 may use fourth moveable PIR sensors, each monitoring 90° of view. In another non-limiting example, the PIR assembly 102 may use six moveable PIR sensors, each monitoring 60° of view. Other numbers of moveable PIR sensors are possible.

Still referring to FIG. 2, in certain implementations, during operation, an installer (not shown) may adjust the first moveable PIR sensor 212d to a fixed position having the fourth placement angle $\alpha_4$ to monitor a zone that the fourth normal vector 112d points to or substantially points to. The installer may adjust the second moveable PIR sensor 212e to a fixed position having the fifth placement angle as to monitor a zone that the fifth normal vector 112e points to or substantially points to. When the first moveable PIR sensor 212d or the second moveable PIR sensor 212e detects an infrared signature, the first moveable PIR sensor 212d or the second moveable PIR sensor 212e may transmit a detection signal to the microcontroller 220 in the stationary circuit board 210. The detection signal may include the intensity of the detected infrared signature. The optional communication component 228 may receive the detection signal. The detection component 226 may compare the intensity of the detected infrared signature with a predetermined intensity threshold. If the intensity of the detected infrared signature satisfies (e.g., exceeds or equal to) the predetermined intensity threshold, the detection component 226 may determine a positive detection (i.e., detecting the presence of a target). In one non-limiting example, the microcontroller 220 may transmit, via the optional communication interface 234 and/or the communication component 228, an indication of positive detection to an external device, such as an alarm panel. In another example, the microcontroller 220 may cause the optional siren 232 to emit a sound indicating the positive detection.

Figure 3:
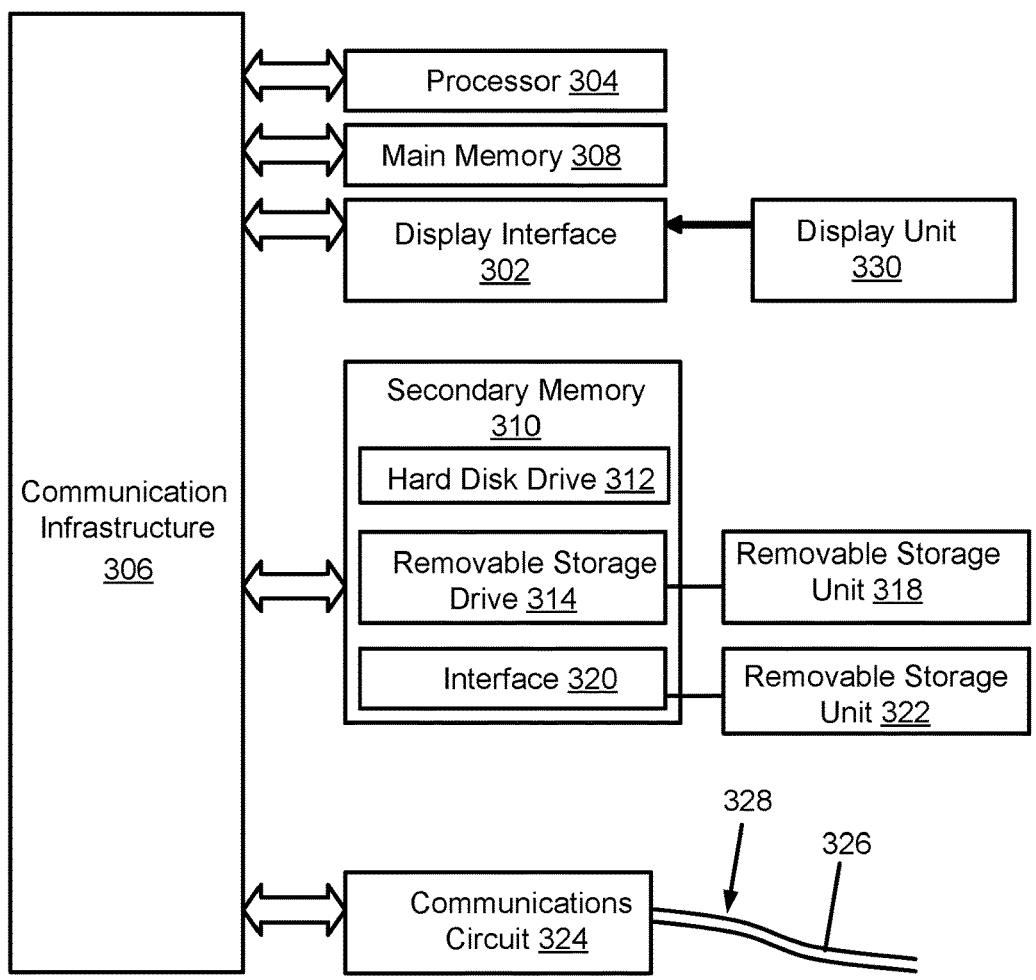
FIG. 3 illustrates an example of a computer system in accordance with aspects of the present disclosure.

Aspects of the present disclosures may be implemented using hardware, software, or a combination thereof and may be implemented in one or more computer systems or other processing systems. In an aspect of the present disclosures, features are directed toward one or more computer systems capable of carrying out the functionality described herein. An example of such the computer system 300 is shown in FIG. 3. In some examples, the PIR assembly 102, the stationary circuit board 210, and/or the microcontroller 220 may be implemented as the computer system 300 shown in FIG. 3. The PIR assembly 102, the stationary circuit board 210, and/or the microcontroller 220 may include some or all of the components of the computer system 300.

The computer system 300 includes one or more processors, such as processor 304. The processor 304 is connected with a communication infrastructure 306 (e.g., a communications bus, cross-over bar, or network). Various software aspects are described in terms of this example computer system. After reading this description, it will become apparent to a person skilled in the relevant art(s) how to implement aspects of the disclosures using other computer systems and/or architectures.

The computer system 300 may include a display interface 302 that forwards graphics, text, and other data from the communication infrastructure 306 (or from a frame buffer not shown) for display on a display unit 330. Computer system 300 also includes a main memory 308, preferably random access memory (RAM), and may also include a secondary memory 310. The secondary memory 310 may include, for example, a hard disk drive 312, and/or a removable storage drive 314, representing a floppy disk drive, a magnetic tape drive, an optical disk drive, a universal serial bus (USB) flash drive, etc. The removable storage drive 314 reads from and/or writes to a removable storage unit 318 in a well-known manner. Removable storage unit 318 represents a floppy disk, magnetic tape, optical disk, USB flash drive etc., which is read by and written to removable storage drive 314. As will be appreciated, the removable storage unit 318 includes a computer usable storage medium having stored therein computer software and/or data. In some examples, one or more of the main memory 308, the secondary memory 310, the removable storage unit 318, and/or the removable storage unit 322 may be a non-transitory memory.

Alternative aspects of the present disclosures may include secondary memory 310 and may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to computer system 300.

Computer system 300 may also include a communications circuit 324. The communications circuit 324 may allow software and data to be transferred between computer system 300 and external devices. Examples of the communications circuit 324 may include a modem, a network interface (such as an Ethernet card), a communications port, a Personal Computer Memory Card International Association (PCMCIA) slot and card, etc. Software and data transferred via the communications circuit 324 are in the form of signals 328, which may be electronic, electromagnetic, optical or other signals capable of being received by the communications circuit 324. These signals 328 are provided to the communications circuit 324 via a communications path (e.g., channel) 326. This path 326 carries signals 328 and may be implemented using wire or cable, fiber optics, a telephone line, a cellular link, an RF link and/or other communications channels. In this document, the terms "computer program medium" and "computer usable medium" are used to refer generally to media such as a removable storage drive 318, a hard disk installed in hard disk drive 312, and signals 328. These computer program products provide software to the computer system 300. Aspects of the present disclosures are directed to such computer program products.

Computer programs (also referred to as computer control logic) are stored in main memory 308 and/or secondary memory 310. Computer programs may also be received via communications circuit 324. Such computer programs, when executed, enable the computer system 300 to perform the features in accordance with aspects of the present disclosures, as discussed herein. In particular, the computer programs, when executed, enable the processor 304 to perform the features in accordance with aspects of the present disclosures. Accordingly, such computer programs represent controllers of the computer system 300.

In an aspect of the present disclosures where the method is implemented using software, the software may be stored in a computer program product and loaded into computer system 300 using removable storage drive 314, hard drive 312, or communications interface 320. The control logic (software), when executed by the processor 304, causes the processor 304 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A passive infrared (PIR) assembly, comprising:
a dome comprising a plurality of optical components;
a stationary circuit board; and
a moveable PIR sensor moveably coupled to the stationary circuit board via a flexible cable, wherein the moveable PIR sensor is configured to move to a first position to monitor a first zone via a first optical component of the plurality of optical components and to a second position to monitor a second zone via a second optical component of the plurality of optical components, wherein the moveable PIR sensor is turnable and rotatable,
wherein the flexible cable enables the moveable PIR sensor to remain in a fixed position.

2. The PIR assembly of claim 1, wherein the moveable PIR sensor is further configured to:
detect a target;
generate, in response to detecting the target, a detection signal; and
sending the detection signal.

3. The PIR assembly of claim 2, further comprising a microcontroller, wherein the microcontroller comprises:
a memory having instructions stored therein; and
a processor that execute the instructions to:
receive the detection signal from the moveable PIR sensor;
compare an intensity of the detection signal with a predetermined intensity threshold; and
determine, in response to the intensity of the detection signal exceeding the predetermined intensity threshold, a positive detection by the PIR sensor.

4. The PIR assembly of claim 3, further comprising a siren configured to emit, in response to the determined positive detection, a sound indicating the positive detection.

5. The PIR assembly of claim 4, wherein the processor is further configured to execute the instructions to, in response to determining the positive detection, cause the siren to emit the sound indicating the positive detection.

6. The PIR assembly of claim 4, further comprising a communication interface that communicates with an external device.

7. The PIR assembly of claim 6, wherein the processor is further configured to execute the instructions to, in response to determining the positive detection, transmit an indication of the positive detection to the external device via the communication interface.

8. The PIR assembly of claim 7, wherein the external device is a fire panel.

9. The PIR assembly of claim 3, further comprising a light configured to emit, in response to the determined positive detection, a light pattern indicating the positive detection.

10. The PIR assembly of claim 1, wherein the flexible cable includes a stiffness that enables the moveable PIR sensor in the first position or the second position.

11. The PIR assembly of claim 1, further comprising a power supply that supplies electrical energy to the PIR assembly.

12. The PIR assembly of claim 11, wherein the power supply comprises one or more batteries.

13. The PIR assembly of claim 11, wherein the power supply is configured to couple with an alternating power supply.

* * * * *